United States Patent
Jones et al.

(10) Patent No.: US 10,368,189 B2
(45) Date of Patent: *Jul. 30, 2019

(54) DEVICE AND METHOD FOR DIRECTING EMPLOYEE MOVEMENT

(71) Applicant: Walmart Apollo, LLC, Bentonville, AR (US)

(72) Inventors: Matthew Allen Jones, Bentonville, AR (US); Nicholaus Adam Jones, Fayetteville, AR (US); Robert James Taylor, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/161,390

(22) Filed: Oct. 16, 2018

(65) Prior Publication Data

US 2019/0052997 A1 Feb. 14, 2019

Related U.S. Application Data

(63) Continuation of application No. 15/342,349, filed on Nov. 3, 2016.

(Continued)

(51) Int. Cl.
| | |
|---|---|
| *H04W 4/02* | (2018.01) |
| *H04B 17/27* | (2015.01) |
| *G01S 5/02* | (2010.01) |
| *H04B 17/318* | (2015.01) |
| *H04W 68/00* | (2009.01) |
| *G01S 11/06* | (2006.01) |

(52) U.S. Cl.
CPC ............. *H04W 4/02* (2013.01); *G01S 5/0294* (2013.01); *H04B 17/27* (2015.01); *H04B 17/318* (2015.01);

(Continued)

(58) Field of Classification Search
CPC ....... H04W 4/02; H04W 4/026; H04W 4/027; H04W 68/00; H04B 17/318; H04B 17/27; G01S 5/0294; G01S 11/06

(Continued)

(56) References Cited

U.S. PATENT DOCUMENTS

| | | | |
|---|---|---|---|
| 6,590,495 B1 * | 7/2003 | Behbehani | B60Q 1/525 340/435 |
| 7,739,157 B2 | 6/2010 | Bonner et al. | |

(Continued)

OTHER PUBLICATIONS

"Indoors: Accurate Real-time Indoor Navigation," indoo.rs Inc., indoo.rs, Sep. 2015.

(Continued)

*Primary Examiner* — Michael Y Mapa
(74) *Attorney, Agent, or Firm* — Schmeiser, Olsen & Watts LLP

(57) ABSTRACT

Described is a system for directing employee movement to maintain a minimum distance between any two employees on a sales floor, and maximize employee coverage on the sales floor. The system includes a first mobile computing device carried by a first employee. The first mobile computing device includes a proximity detection module that detects the proximity of a second mobile computing device carried by a second employee. If it is determined that the distance between the first and the second employee is too small, the first mobile computing device will output a motion direction instruction to the first employee, telling the first employee to change direction, thus increasing the distance between the first and the second employee. The mobile computing devices can be in communication with a base station that receives proximity information and helps coordinate employee coverage and motion direction instructions.

20 Claims, 9 Drawing Sheets

Related U.S. Application Data

(60) Provisional application No. 62/259,360, filed on Nov. 24, 2015.

(52) U.S. Cl.
CPC ........... *H04W 4/026* (2013.01); *H04W 4/027* (2013.01); *H04W 68/00* (2013.01); *G01S 11/06* (2013.01)

(58) Field of Classification Search
USPC .... 455/115.3, 134, 161.3, 226.2, 456.1–457, 455/513
See application file for complete search history.

(56) References Cited

U.S. PATENT DOCUMENTS

| | | |
|---|---|---|
| 8,422,987 B2 | 4/2013 | Kane et al. |
| 8,615,254 B2 | 12/2013 | Jamtgaard et al. |
| 9,288,088 B1* | 3/2016 | McIlroy ................. H04L 25/40 |
| 2014/0052293 A1* | 2/2014 | Bruemmer ........... G05D 1/0088 |
| | | 700/248 |
| 2014/0226852 A1 | 8/2014 | Lei et al. |
| 2014/0244437 A1 | 8/2014 | Longino |
| 2015/0025929 A1 | 1/2015 | Abboud et al. |
| 2016/0381688 A1 | 12/2016 | Hedayat |

OTHER PUBLICATIONS

"Managing Primary and Secondary Sales," QUYTECH, PepUpSales.com, Sep. 22, 2015.
"Solution Overview & Use Cases: Taking Store Operations to the Next Level," Theatro, Theatro.com, Sep. 2015.
Non-Final Office Action in U.S. Appl. No. 15/342,349 dated Mar. 30, 2018; 52 pages.
Notice of Allowance in U.S. Appl. No. 15/342,349 dated Sep. 11, 2018; 19 pages.

* cited by examiner

DEVICE AND METHOD FOR DIRECTING EMPLOYEE MOVEMENT

CROSS REFERENCE TO RELATED APPLICATION

This application in a continuation of, and claims priority to, U.S. patent application Ser. No. 15/342,349 filed Nov. 3, 2016 and entitled "Device and Method for Directing Employee Movement," which claims priority to U.S. provisional patent application Ser. No. 62/259,360, filed Nov. 24, 2015, and entitled "Device and Method for Directing Employee Movement".

BACKGROUND OF THE INVENTION

Technical Field

This invention relates to devices for coordinating the movements of employees, and specifically to a device and method for maximizing employee coverage of a sales area in a retail store.

State of the Art

Retail stores often have a number of employees whose job is, partially or wholly, to maintain a presence on a sales floor of the retail store. The employees are there to handle any need that arises on the sales floor that requires resolution by an employee, such as helping customers who need assistance while shopping, or monitoring the status of certain areas of the store. Customers who are shopping, for example, may need help finding an area of the store or a specific product. It is in the best interest of the retail store to help customers as quickly as possible, without making the customer search too hard or wait too long for assistance. Employees whose job it is to provide help to customers are considered to be in "coverage" mode, meaning they are a part of a network of employees that provide employee coverage of the retail store. In order to maximize employee coverage of an area or a store, it is best to keep employees distributed throughout the area or the store instead of bunched up in some areas and spread too far apart in other areas. To keep employee coverage maximized, those employees that are in coverage mode try to keep away from other employees that are also in coverage mode, so that their respective territories do not overlap. This can be accomplished visually, by one employee changing direction and moving away when they see another employee. However, it is often hard for employees to visually maintain separate territories, due to store shelves and other fixtures that block views, and the fact that employees in coverage mode may have their attention directed towards things besides watching where their fellow employees are.

Accordingly, what is needed is a device and method for directing employee movement that will detect when two employees in coverage mode get too close, and send an instruction to one or both of the employees to change their direction of motion, thus keeping a minimum distance between employees in coverage mode.

DETAILED DESCRIPTION OF EMBODIMENTS OF THE INVENTION

Figure 1:
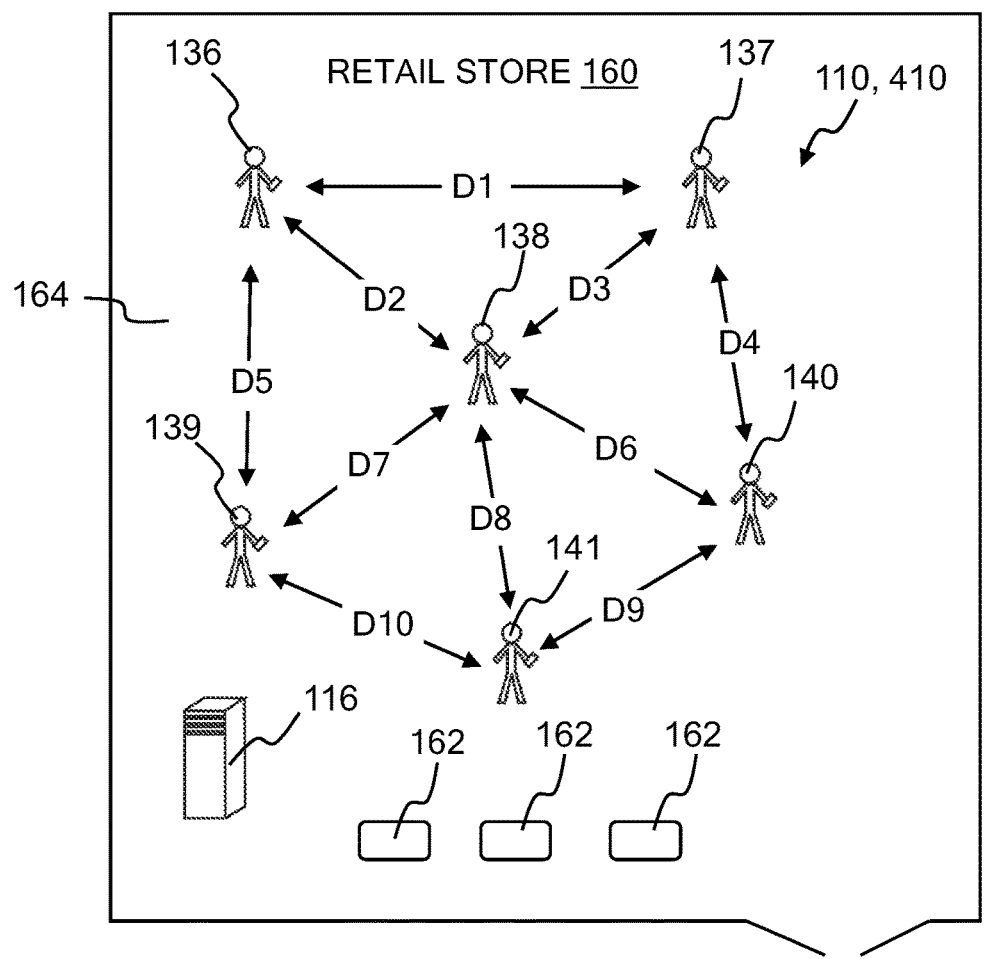
FIG. 1 shows a simplified drawing of a retail store using a system for directing employee movement.

As discussed above, embodiments of the present invention relate to devices for coordinating the movements of employees of businesses such as retail stores, and specifically to a device and method for maximizing employee coverage of a retail store.

Disclosed is a system for directing employee movement in a retail store. The system for directing employee movement is used to maintain a minimum distance, or proximity, between any two employees, and maximize employee placement and coverage on a retail store sales floor. The system includes a first mobile computing device carried by a first employee. The first mobile computing device includes a proximity detection module that detects the proximity of a second mobile computing device carried by a second employee. If it is determined that the proximity, or distance, between the first and the second employee is too small, the first mobile computing device will output a motion direction instruction to the first employee, telling the first employee to change direction, thus increasing the distance between the first and the second employee. In some embodiments, the mobile computing devices are in communication with a base station that receives proximity information and helps coordinate employee coverage and motion direction instructions. When implemented with a plurality of employees, the employees will create a web of employee coverage in the retail store, maintaining at least a minimum distance between each employee, thus maximizing employee coverage, and customer access to employees.

Retail stores often have a number of employees whose job is, partially or wholly, to maintain a presence on a sales floor of the retail store. The employees are there to handle any need that arises on the sales floor that requires resolution by an employee, such as helping customers who need assistance while shopping, or monitoring the status of certain areas of the store. Customers who are shopping, for example, may need help finding an area of the store or a specific product. It is in the best interest of the retail store to help customers as quickly as possible, without making the customer search too hard or wait too long for assistance. Employees whose job it is to provide help to customers are considered to be in "coverage" mode, meaning they are a part of a network of employees that provide employee coverage of the retail store. In order to maximize employee coverage of an area or a store, it is best to keep employees distributed throughout the area or the store instead of bunched up in some areas and spread too far apart in other areas. To keep employee coverage maximized, those employees that are in coverage mode try to keep away from other employees that are also in coverage mode, so that their respective territories do not overlap. This can be accomplished visually, by one employee changing direction and moving away when they see another employee. However, it is often hard for employees to visually maintain separate territories, due to store shelves and other fixtures that block views, and the fact that employees in coverage mode may have their attention directed towards things besides watching where their fellow employees are. The disclosed system uses mobile computing devices and a wireless network to detect when employees get too close to each other, and to provide instructions to employees to change their direction of motion when they get too close.

Disclosed is a system for directing, or coordinating, employee movements. The system for directing employee movement is coordinating the movement of employees in order to maximize the coverage of employees in a retail store. Maximizing employee coverage means keeping the network of employees that are in coverage mode spread out from each other so that their territories overlap as little as possible, thereby creating as large an area as possible covered by the network of employees. In an example embodiment, the system contains at least a first and a second mobile computing device that are carried by a first and a second employee. In some embodiments, there are more mobile computing devices carried by more employees. The system also contains a means for determining a distance between the first and the second mobile computing device, and a means for outputting a motion direction instruction to either the first or the second employee. The motion direction instruction informs an employee to change their direction of motion in order to keep away from another employee who is also in coverage mode. The motion direction instruction, in our example embodiment, instructs either the first or the second mobile computing device to tell the first or the second employee to change their direction of their motion, for example. The motion direction instruction can be a simple indicator that informs the employee to change direction, or it can be a detailed set of instructions that provide a new direction of motion or path for the employee to take, or anything in between.

In some embodiments, the motion direction instruction is created and output by the first or the second mobile computing device. In some embodiments, the motion direction instruction is created by a base station communicatively coupled to the first or the second mobile computing device, and sent to the first or the second mobile computing device for display to the first or the second employee.

The system can use any number of types of information to decide when to send a motion direction instruction to an employee. The system for directing employee motion can use any or all of the following to determine when to output a motion direction instruction to an employee: the proximity between the first and the second mobile computing device; the detection of a coverage signal output by one or both of the mobile computing devices; a signal strength of the coverage signal of one or both of the mobile computing devices; a coverage status of one or both of the mobile computing devices; a motion status of one or both of the mobile computing devices; or any combination of these pieces of information, as explained herein in general terms and with specific examples as shown in the figures and described in the accompanying text. In some embodiments, the means for outputting the motion direction instruction uses additional information in determining whether to send a motion direction instruction to a specific mobile computing device or employee.

Each mobile computing device transmits a coverage signal that extends a predetermined distance around the mobile computing device. In some embodiments, the motion direction instruction is provided to the first employee by the first mobile computing device in response to the first mobile computing device receiving the coverage signal from the second mobile computing device. In some embodiments, the means for determining a proximity measures the signal strength of the coverage signal. In some embodiments, the motion direction instruction is provided to the first employee by the first mobile computing device in response to the coverage signal from the second mobile computing device having a signal strength greater than a predetermined maximum signal strength.

In some embodiments, the motion direction instruction is provided to the first employee by the first mobile computing device in response to the distance (proximity) between the first and the second mobile computing device being less than a predetermined minimum distance.

In some embodiments, the system for coordinating employee movement includes a means for providing a coverage status of the first and/or the second mobile computing devices. The means for providing the coverage status of the first or the second mobile computing device can be in the first or the second mobile computing device, or can be a part of a base station that provides the coverage status to the first or the second mobile computing devices. In some embodiments, the motion direction instruction is provided to the first employee by the first mobile computing device in response to the coverage status of the first mobile computing device indicating that the first employee is in coverage mode. In some embodiments, the motion direction instruction is provided to the first employee by the first mobile computing device in response to the coverage status of the second mobile computing device indicating that the second employee is in coverage mode. In some embodiments, the motion direction instruction is provided to the first employee by the first mobile computing device in response to the coverage status of the first and the second mobile computing devices indicating that the first and the second employees are both in coverage mode.

In some embodiments, the motion direction instruction is provided to the first employee by the first mobile computing device in response to the proximity between the first and the second mobile computing device being less than a predetermined minimum distance, and the coverage status of the first mobile computing device indicating that the first employee is in coverage mode.

In some embodiments, the system for coordinating employee movement includes a means for providing a motion status of the first and/or the second mobile computing devices. In some embodiments, the motion direction instruction is provided to the first employee by the first mobile computing device in response to the motion status of the first mobile computing device indicating that the first employee is in motion. In some embodiments, the motion direction instruction is provided to the first employee by the first mobile computing device in response to the motion status of the second mobile computing device indicating that the second employee is in motion. In some embodiments, the motion direction instruction is provided to the first employee by the first mobile computing device in response to the motion status of the first and the second mobile computing devices indicating that both first and the second employees are in motion. In some embodiments, the motion direction instruction is provided to the first employee by the first mobile computing device in response to the proximity between the first and the second mobile computing device being less than a predetermined minimum distance, and the motion status of the first mobile computing device indicating that the first employee is in motion.

It is to be understood that the system for directing employee motion can use any information, including but not limited to the proximity or distance between the first and the second employee, a signal strength of a coverage signal of the first or the second mobile computing device, a motion status of the first or the second mobile computing device, or a coverage status of the first or the second employee, to decide whether to send a motion direction instruction to either the first or the second employee.

FIG. 1 through FIG. 9 show specific examples of systems for directing employee movement and maximizing the coverage of a plurality of employees, These systems show examples of different means for determining a proximity between a first and a second mobile computing device, means for outputting a motion direction instruction, means for providing a coverage status, and means for providing a motion status. It is to be understood that many different embodiments and forms are possible, besides the examples shown in the figures and described in this document.

Figure 2:
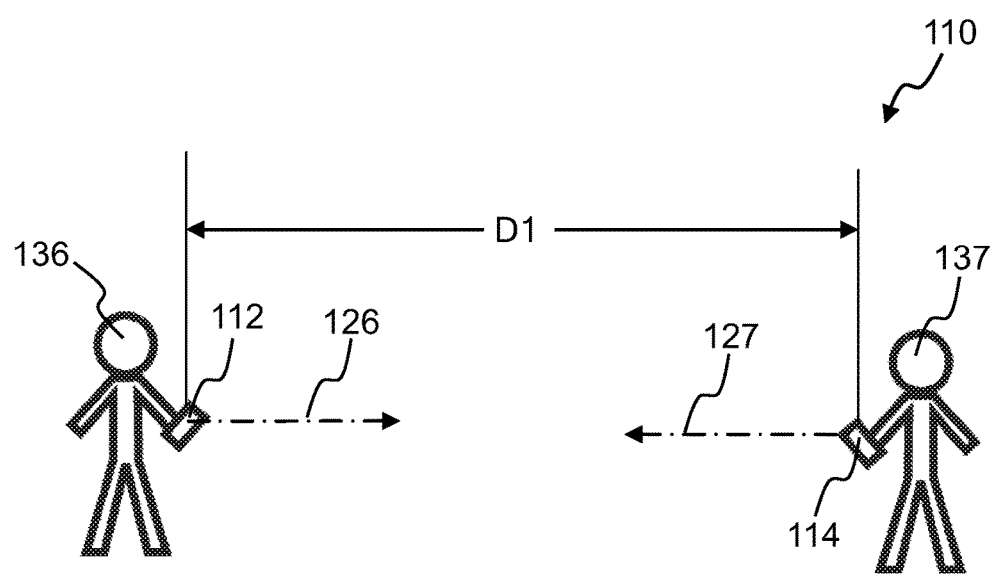
FIG. 2 shows a simplified illustration of two employees using a system for directing employee movement, where each employee has a mobile computing device for directing employee motion.
Figure 3:
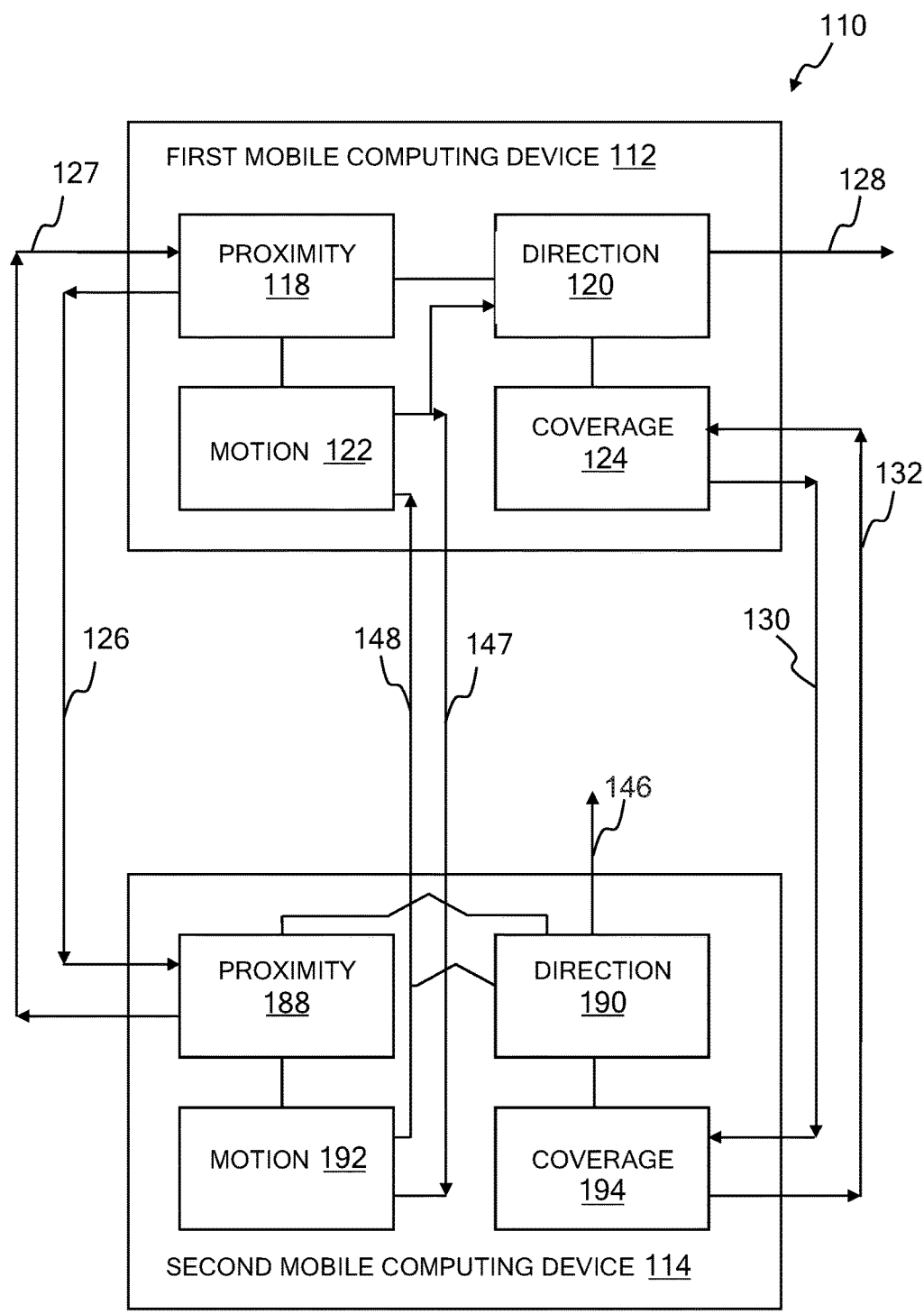
FIG. 3 shows a block diagram of the system for directing employee movement of FIG. 2.
Figure 6:
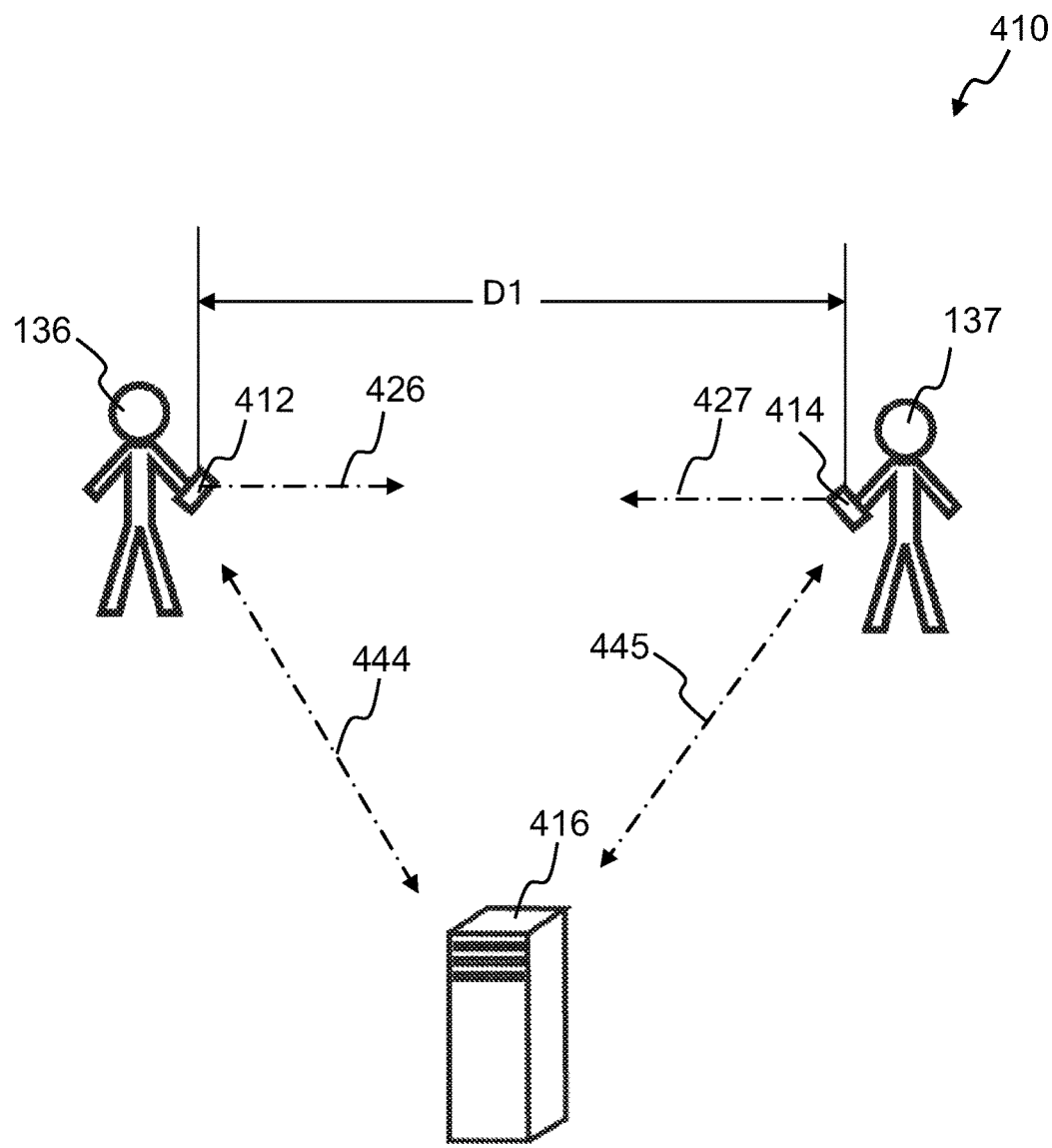
FIG. 6 shows a simplified illustration of two employees using an alternate system for directing employee movement, where each employee has a mobile computing device for directing employee motion communicating with a base station.
Figure 7:
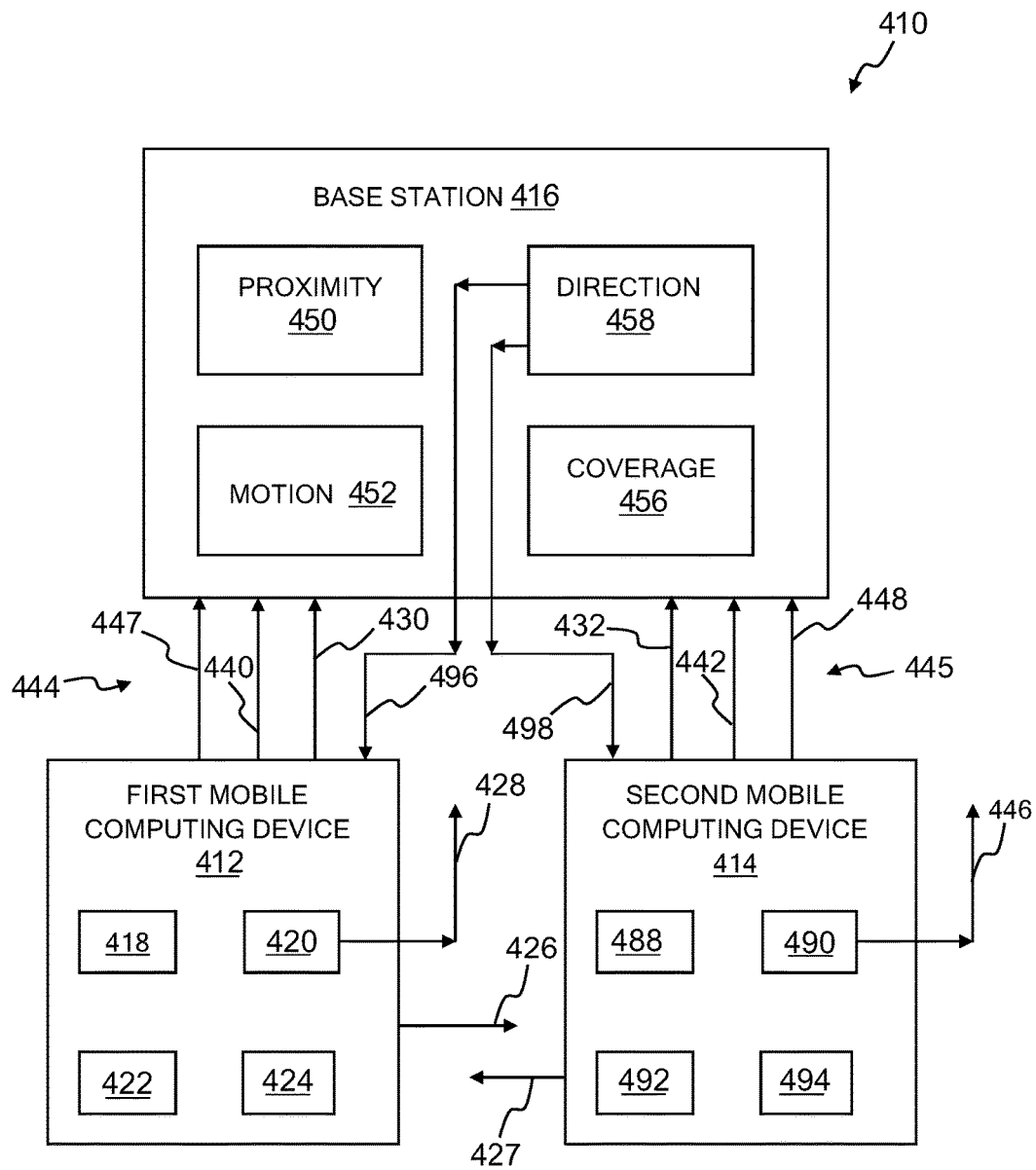
FIG. 7 shows a block diagram of the system for directing employee movement of FIG. 6.

FIG. 1 illustrates a retail store 160 using a system for directing employee movement 110 or 410. System for directing employee movement 110 is shown in FIG. 1, FIG. 2 and FIG. 3, and described in the accompanying text. System for directing employee movement 410 is shown in FIG. 1, FIG. 6 and FIG. 7, and described in the accompanying text. Retail store 160 as shown in FIG. 1 has a plurality of employees which populate a sales floor 164. Each employee carries a mobile computing device that is part of system 110 or 410, and which provides the motion direction instructions to the employee. The plurality of employees, in this example embodiment, includes a first employee 136, a second employee 137, a third employee 138, a fourth employee 139, a fifth employee 140, and a sixth employee 141. Retail store 160 also includes a base station 116, which in this embodiment is a store server, and a number of checkout registers 162. Employees 136, 137, 138, 139, and 141 are in "coverage" mode in this embodiment, meaning at least a portion of their responsibilities include maintaining a presence on sales floor 164 to support customers that need assistance. Employees in coverage mode strive to create a web of employees that covers as large an area as possible on sales floor 164, so that there are no areas where customers are neglected or have trouble finding an employee to help them. The best way to create a large area of employee coverage is to keep employees 136-141 at least a minimum distance, or proximity, away from each other, so that there are not groups of employees bunched in any one area, leaving other areas uncovered.

FIG. 1 illustrates a number of proximities or distances between employees, shown as distance D1 between first employee 136 and second employee 137, distance D2 between first employee 136 and third employee 138, distance D3 between second employee 137 and third employee 138, distance D4 between second employee 137 and fifth employee 140, distance D5 between first employee 136 and fourth employee 139, distance D6 between third employee 138 and fifth employee 140, distance D7 between fourth employee 139 and third employee 138, distance D8 between third employee 138 and sixth employee 141, distance D9 between fifth employee 140 and sixth employee 141, and distance D10 between fourth employee 139 and sixth employee 141. It is to be understood that there are other distances between these employees, distances D1 through D10 are shown as examples and to illustrate the concept of coverage, and are not meant to be limiting. Employee coverage on sales floor 164 of retail store 160 is maximized by keeping proximity distances D1 through D10 as large as possible so employees are not bunched together, and keeping any one of distances D1 through D10 greater than a predetermined minimum distance, or proximity, between any two employees.

As an employee is moving about sales floor 164, system for directing employee movement 110 and 410 provides a motion direction instruction to the employee if they get too close to another employee that is in coverage mode. The motion direction instruction can be a simple notification that the employee should change direction, or it can be a more complex indication of which direction to move in, or a path for the employee to take. The motion direction instructions are provided to each employee by the mobile computing device they are carrying. Each mobile computing device is connected to a wireless network so the mobile computing devices can communicate within system 110 or 410, with one another and, in some embodiments, with base station 116. As employees 136, 137, 138, 139, 140, and 141 move about sales floor 164, their motions are directed by system for directing employee motion 110 or 410, which results in a web of employee coverage as large as possible, providing assistance to as many customers as possible.

It is to be understood that there may be other employees on sales floor 164 that are not in coverage mode, and may or may not be provided motion direction instructions. An employee that is helping a customer, for example, or is performing another specific task, may either not be provided with motion direction instructions, or will ignore the motion direction instructions until the task is complete and they are back in coverage mode.

FIG. 2 shows first employee 136 and second employee 137 using system 110 for directing employee motion. FIG. 3 shows a block diagram of system 110 for directing employee motion. Each of first employee 136 and second employee 137 carries a mobile computing device for directing employee motion, with first employee 136 carrying a first mobile computing device 112 for directing employee motion, and second employee 137 carrying a second mobile computing device 114 for directing employee motion. System 110 includes first and second mobile computing devices 112 and 114, which communicate with each other to direct employee motion. System 410 shown in FIG. 6 and FIG. 7 also uses base station 116, as will be discussed below. System 110 uses mobile computing devices 112 and 114 to provide motion direction instructions to first and second employee 136 and 137 in order to maintain a minimum distance D1 between first and second employee 136 and 137, and, in some embodiments, to direct either first employee 136 or second employee 137 to change direction if distance D1 becomes smaller than a predetermined minimum distance. The explanation herein is from the standpoint of first employee 136 and first mobile computing device 112, but it is to be understood that system 110 would operate the same for second employee 137, or for any other employee using system 110, such as employee 138, 139, 140, or 141 as shown in FIG. 1.

Mobile computing device 112 and mobile computing device 114 (and any other mobile computing devices in the network of employees in coverage mode) each transmit a coverage signal when the devices are placed in "coverage" mode by first employee 136 or second employee 137. When first mobile computing device 112 is placed in coverage mode, first mobile computing device 112 transmits coverage signal 126, and first employee 136 and first mobile computing device 112 are a part of the web of employees covering retail sales floor 164, as shown in FIG. 1. The same is true for second employee 137 and second mobile computing device 114 (which emits a coverage signal 127 as shown in FIG. 2), and any other employees that are carrying a mobile computing device for directing employee motion that is in coverage mode.

First mobile computing device 112 includes a proximity detection module 118, a direction module 120, a motion detection module 122, and a coverage module 124, as shown in FIG. 3. Proximity detection module 118, direction module 120, motion detection module 122, and coverage module 124 are used to determine when to provide a motion direction instruction 128 to first employee 136. Second mobile computing device 114 is the same or similar, with a proximity detection module 188, a direction module 190, a motion detection module 192, and a coverage module 194.

Proximity detection modules 118 and 188 each transmit coverage signals 126 and 127 respectively, and receive the coverage signals from other mobile computing devices for directing employee motion. First mobile computing device 112 transmits coverage signal 126, and receives coverage signal 127 from second mobile computing device 114 when second mobile computing device 114 is within reception range of first mobile computing device 112. In some embodiments, the range of coverage signals 126 and 127 is set to be a predetermined minimum distance. Thus, one way of determining when first employee 136 is getting too close to second employee 137, in other words, when distance D1 is getting too small, is for first mobile computing device 112 to receive coverage signal 127 from second mobile computing device. If proximity module 118 detects coverage signal 127 from second mobile computing device 114, first mobile computing device 112 concludes that the distance D1 between first mobile computing device 112 and second mobile computing device 114 is equal to or less than the predetermined minimum distance, and provides first employee 136 with a motion direction instruction 128 until proximity module 118 no longer detects coverage signal 127. Coverage signals 126 and 127 can be Bluetooth signals, 802.11 signals, or radio frequency identification (RFID) signals, for example but not by way of limitation.

In some embodiments, proximity detection module 118 computes distance D1 between first mobile computing device 112 and second mobile computing device 114. Proximity detection module 118 and 188 can use many different ways to determine or measure proximity, or distance D1, between first and second mobile computing devices 112 and 114. In some embodiments, proximity detection module 118 uses a signal strength meter to measure the signal strength of coverage signal 127. Once the signal strength of coverage signal 127 is above a predetermined maximum signal strength that represents a predetermined minimum distance, proximity detection module 118 determines that distance D1 is less than the predetermined minimum distance. In some embodiments, proximity detection module 118 uses the signal strength of coverage signal 127 to compute a value for the distance D1 between first and second employee 136 and 137.

In some embodiments, proximity detection module 118 can use other signals or communication from second mobile computing device 114 to determine distance D1. In some embodiments, proximity detection module 118 and proximity detection module 188 communicate to determine distance D1. In some embodiments, proximity detection module 118 or 188 use a wireless received signal strength indicator (RSSI) to determine proximity distance D1. In some embodiments, proximity detection module 118 or 188 use Bluetooth signals, 802.11 signals, radio frequency identification (RFID) signals, global positioning system (GPS) signals, compass signals, camera or video images, accelerometer signals, or other devices, measurements, or input to determine distance D1.

Direction module 120 outputs motion direction instruction 128 when first mobile computing device 112 determines that first employee 136 should change direction. Mobile computing device 112 and direction module 120 can use many different criteria to decide when to output motion direction instruction 128. In some embodiments, direction module 120 outputs motion direction instruction 128 in response to proximity detection module 118 receiving coverage signal 127 transmitted by second mobile computing device 114. In this embodiment, when first mobile computing device 112 gets close enough to second mobile computing device 114 that proximity detection module 118 receives coverage signal 127, direction module 120 outputs motion direction instruction 128, which tells first employee 136 to change their direction of motion.

Similarly, in some embodiments, when first mobile computing device 112 gets close enough to second mobile computing device 114 that proximity detection module 188 receives coverage signal 126, direction module 190 outputs motion direction instruction 146, which tells second employee 137 to change their direction of motion. In some embodiments, first and second mobile computing device 112 and 114 will communicate to determine which one should output a motion direction instruction, and if so, which one. Some examples of these communications are explained herein, but it is to be understood that many different forms and types of communication can be used to determine which of first or second mobile computing device 112 or 114 should output a motion direction instruction 128 or 146.

Motion detection modules 122 and 192 detect motion of first and second mobile computing devices 112 and 114, respectively. Motion can be detecting by a gyro, for instance, an accelerometer, a camera or any other motion detecting device on first mobile computing device 112 and second mobile computing device 192, or motion detecting devices external to mobile computing devices 112 and 114.

Motion detection module 122 outputs a first mobile computing device motion indicator 147, which indicates whether first mobile computing device 112 is in motion or not, and motion detection module 192 outputs a second mobile computing device motion indicator 148, which indicates whether second mobile computing device 114 is in motion or not. In some embodiments, this determination of whether first or second mobile computing device 112 or 114 is in motion is used to determine whether to output motion direction instruction 128 or 146. Motion detection module 122 and 192 are used because, in some cases, it may be desirable to not give first employee 136, for example, a motion direction instruction if they are not moving. First employee 136 may be stopped to help a customer, or to do a different task. In some embodiments, if first mobile computing device 112 is not in motion, direction module 120 does not transmit motion direction instruction 128.

In some embodiments, direction module 120 outputs motion direction instruction 128 in response to proximity detection module 118 receiving coverage signal 127, and motion detection module 122 detecting that first mobile computing device 112 is in motion. In some embodiments, direction module 120 outputs motion direction instruction 128 in response to proximity detection module 118 receiving coverage signal 127, the signal strength of coverage signal 127 being above a predetermined maximum signal strength, and motion detection module 122 detecting that first mobile computing device 112 is in motion. Many other combinations of detecting proximity, signal strength, or motion can be used to determine whether to output motion direction instructions 128 or 146.

In some embodiments, direction module 120 outputs motion direction instruction 128 in response to proximity detection module 118 receiving coverage signal 127, and motion detection module 122 detecting that first mobile computing device 112 is in motion, and motion detection module 122 detecting that second mobile computing device 114 is in motion. First mobile computing device 112 can determine whether second mobile computing device 114 is in motion because motion detection module 122 receives second mobile computing device motion indicator 148, which indicates whether second mobile computing device 114 is in motion or not. In some embodiments, direction module 120 outputs motion direction instruction 128 in response to proximity detection module 118 receiving coverage signal 127, a strength of coverage signal 127 being above a predetermined maximum signal strength, and motion detection module 122 detecting that first mobile computing device 112 and second mobile computing device 114 are both in motion.

Coverage modules 124 and 194 determine a coverage status of mobile computing devices 112 and 114, respectively. Coverage module 124 outputs coverage status indicator 130, which indicates whether first mobile computing device 112 is in coverage mode or not. Coverage module 194 outputs coverage status indicator 132, which indicates whether second mobile computing device 114 is in coverage mode or not. First or second mobile computing device 112 or 114 being in coverage mode means that the employee carrying first or second mobile computing device 112 or 114 is part of the web of coverage employees on sales floor 164, and that the employee should be issued instructions to change direction in order to maintain distance from other employees in coverage mode. First and second mobile computing devices 112 and 114 exchange coverage status indicators 130 and 132 to help determine which one, both, or neither of direction modules 120 or 190 should output a motion direction instruction 128 or 146.

In some embodiments, coverage module 124 of first mobile computing device 112 outputs first coverage status indicator 130, and receives second coverage status indicator 132. In some embodiments, direction module 120 outputs motion direction instruction 128 when both first coverage status indicator 130 and second coverage status indicator 132 indicate their respective mobile computing devices 112 and 114 are in coverage mode. In some embodiments, direction module 120 outputs motion direction instruction 128 when either one of first coverage status indicator 130 or second coverage status indicator 132 indicate their respective mobile computing devices 112 or 114 are in coverage mode.

In some embodiments, direction module 120 outputs motion direction instruction 128 in response to proximity detection module 118 receiving coverage signal 127, first and second coverage status indicators 130 and 132 indicating that both first and second mobile computing devices 112 and 114 are in coverage mode, and motion detection module 122 detecting that first mobile computing device 112 is in motion. In some embodiments, direction module 120 outputs motion direction instruction 128 in response to proximity module 118 determining that the distance D1 between first and second mobile computing devices 112 and 114 is less than a predetermined minimum distance, and first and second coverage status indicators 130 and 132 indicating that both first and second mobile computing devices 112 and 114 are in coverage mode. Many other combinations of proximity, coverage status, and motion status can be used to determine when to output motion direction instructions 128 and 146.

Figure 4:
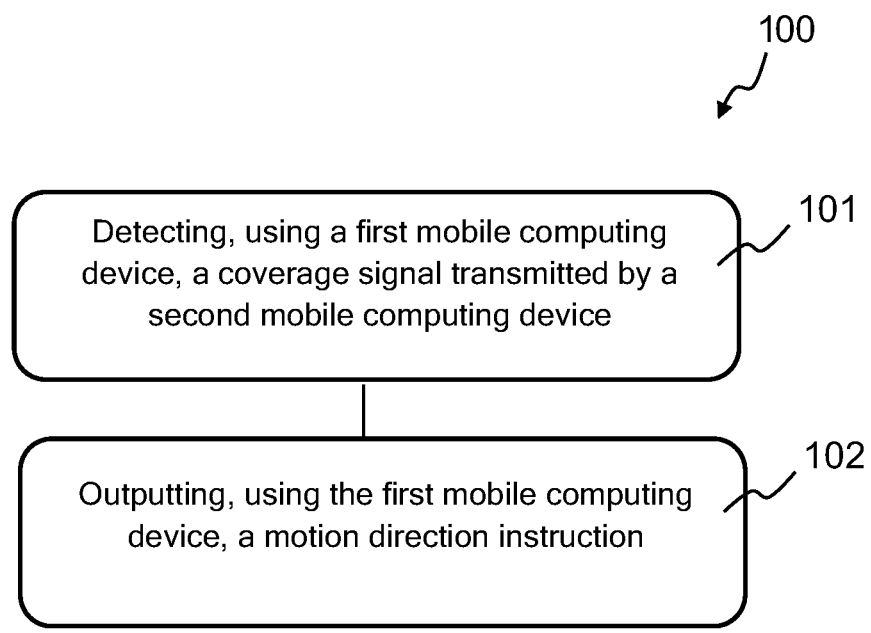
FIG. 4 illustrates a method of providing a motion direction instruction to an employee.
Figure 5:
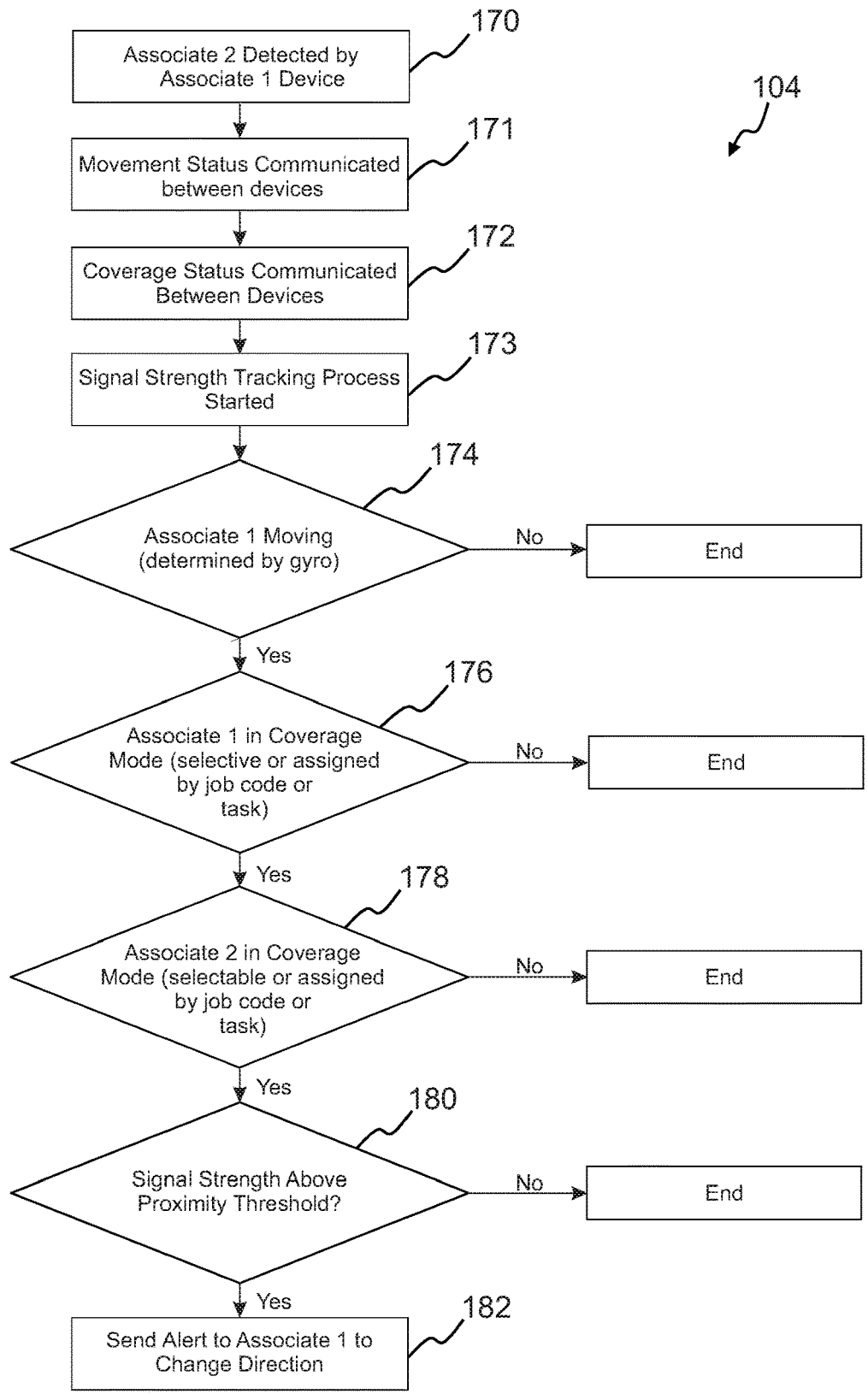
FIG. 5 illustrates a further method of providing a motion direction instruction to an employee.

FIG. 4 and FIG. 5 illustrate methods of providing a motion direction instruction to an employee. FIG. 4 illustrates method 100 of providing a motion direction instruction to an employee carrying a first mobile computing device. Method 100 can be implemented using system 110, for example, but not by way of limitation. Method 100 includes an act 101 of detecting, using the first mobile computing device, a coverage signal transmitted by a second mobile computing device. Method 100 also includes an act 102 of outputting, using the first mobile computing device, a motion direction instruction. An employee carrying the first mobile computing device will received the motion direction instruction. The employee will be instructed by the motion direction instruction to change direction, for example, or receive other motion-related instructions. In some embodiments, method 100 includes determining a coverage mode of the second mobile computing device. In some embodiments, method 100 includes determining a coverage mode of the first mobile computing device. In some embodiments, act 102 of outputting the motion direction instruction includes outputting the motion direction instruction in response to determining that both the first and the second mobile computing devices are in coverage mode. In some embodiments, determining a coverage mode of the second mobile computing device includes receiving, using the first mobile computing device, a coverage mode indicator of the second mobile computing device.

In some embodiments, method 100 includes detecting a signal strength of the coverage signal transmitted by the second mobile computing device. In some embodiments, the motion direction instruction is output in response to the signal strength being greater than a predetermined maximum signal strength. In some embodiments, the first mobile computing device detects the signal strength of the coverage signal transmitted by the second mobile computing device. In some embodiments, method 100 includes determining a proximity between the first and the second mobile computing devices. In some embodiments, the first mobile computing device determines the proximity between the first and the second mobile computing devices. In some embodiments, a proximity module of the first mobile computing device computes the proximity between the first and the second mobile computing devices. In some embodiments, the motion direction instruction is output in response to the proximity being less than a predetermined minimum proximity or distance.

In some embodiments, method 100 includes detecting whether the first mobile computing device is in motion. In some embodiments, method 100 includes detecting whether the second mobile computing device is in motion. In some embodiments, method 100 includes receiving, with the first mobile computing device, an indicator of whether the second mobile computing device is moving. In some embodiments, the motion direction instruction is output in response to the first mobile computing device determining that the first mobile computing device is in motion, the second mobile computing device is in motion, or both the first and the second mobile computing devices are in motion. Method 100 can include many other acts.

FIG. 5 illustrates a method 104 of providing a motion direction instruction to a first employee carrying a first mobile computing device. Method 104 can be implemented using system 110, for example, but not by way of limitation. Method 104 includes a block 170, in which a second associate (employee) carrying a second mobile computing device is detected by the first associate carrying the first mobile computing device. The first mobile computing device can detect the second mobile computing device by detecting a coverage signal, for example but not by way of limitation. Block 171 indicates that motion status indicators are communicated between the first and second mobile computing devices. Block 172 indicates that coverage status indicators are communicated between the first and the second mobile computing devices. Block 173 indicates that signal strength or other proximity determination and tracking measures are begun by either the first or the second mobile computing devices.

Block 174 indicates that method 104 is continued if it is determined that the first associate is in motion, otherwise the method is ended. Block 176 indicates method 104 is continued if the first associate is determined to be in coverage mode. Coverage mode determination can be made by a selection by the first associate or by a job or task code entry into the first mobile computing device. Block 178 indicates the method is continued if the second associate is determined to also be in coverage mode. Block 180 indicates the method is continued if the signal strength of the coverage signal is determined to be above a predetermined maximum signal strength. Block 182 indicates that the first associate is provided with a motion direction instruction by the first mobile computing device, if all of block 174, block 176, block 178, and block 180 are determined to be positive. Method 104 can include many other blocks, steps, or acts.

FIGS. 6 and 7 illustrate system 410 for directing employee movements. System 410 for directing employee movement is similar to system 110 for directing employee movement, except that system 410 includes a base station device 416, which in this embodiment is a store server located in retail store 160 (FIG. 1) with a number of utilities loaded onto base station 416. Base station 416 is a device for coordinating employee movement. Base station has input/output abilities, communication abilities, and computing abilities. Base station device 116 communicates with first and second mobile computing devices 412 and 414, and handles some of the processing and motion direction instead of these tasks being done by the mobile computing devices, as in system 110 described above. Base station 116 is a device for coordinating employee movement, working with first and second mobile computing devices 412 and 414 to coordinate the movement of first and second employee 136 and 137.

FIG. 6 shows first employee 136 and second employee 137 using system 410 for directing employee motion. FIG. 7 shows a block diagram of system 410 for directing employee motion. Each of first employee 136 and second employee 137 carries a mobile computing device for directing employee motion, with first employee 136 carrying a first mobile computing device 412 for directing employee motion, and second employee 137 carrying a second mobile computing device 414 for directing employee motion. Mobile computing devices 412 and 414 are the same or similar to mobile computing devices 112 and 114, except, in this embodiment, mobile computing device 412 and 414 can communicate with each other and with base station 416 to determine when to provide (output) a motion direction instruction to employee 136 or 137. In some embodiments, mobile computing devices 412 and 414 are the same devices as mobile computing devices 112 and 114, since, in some embodiments, the devices are configured to work in either system 110 as described earlier, or in system 410.

System 410 uses mobile computing device 412 and 414 each communicating with each other and with base station 416, to provide motion direction instructions 428 and/or 446 to first and second employee 136 and 137, in order to keep distance D1 between first and second employee 136 and 137 from getting too close, and, in some embodiments, to direct either first employee 136 or second employee 137 to change direction if distance D1 gets smaller than a predetermined minimum distance. The explanation herein is from the standpoint of first employee 136 and first mobile computing device 412, but it is to be understood that system 410 would operate the same for second employee 137, or for any other employees using system 410, such as employee 138, 139, 140, or 141 as shown in FIG. 1.

Mobile computing device 412 and mobile computing device 414 (and any other mobile computing devices in the network of employees in coverage mode) each transmit a coverage signal when the devices are placed in "coverage" mode by first employee 136 or second employee 137. When first mobile computing device 412 is in coverage mode, first mobile computing device 412 transmits a coverage signal 426, and first employee 136 and first mobile computing device 412 are a part of the web of employees covering retail sales floor 164 as shown in FIG. 1. Second mobile computing device 414 transmits a coverage signal 427 when second employee 137 and second mobile computing device 414 are in coverage mode. Coverage signals 426 and 427 can be Bluetooth signals, 802.11 signals, or radio frequency identification (RFID) signals, for example but not by way of limitation.

First mobile computing device 412 is communicatively coupled to base station 416 with communication 444, as shown in FIG. 6 and FIG. 7. Second mobile computing device 414 is communicatively coupled to base station 416 using communication 445. Communication 444 is wireless communication in this embodiment, but can be wired. Communication 444 in this embodiment includes a first coverage status indicator 430, a first proximity signal 440, a first motion status indicator 447, and a first motion direction instruction 496. Communication 445 is wireless communication in this embodiment, but can be wired. Communication 445 in this embodiment includes a second coverage status indicator 432, a second proximity signal 442, a second motion status indicator 448, and a second motion direction instruction 498.

First mobile computing device 412 includes a proximity detection module 418, a direction module 420, a motion detection module 422, and a coverage module 424, as shown in FIG. 7. Second mobile computing device 414 is the same or similar, with a proximity detection module 488, a direction module 490, a motion detection module 492, and a coverage module 494.

First and second mobile computing device 412 and 414 each transmit coverage signals 426 and 427 respectively, and receive the coverage signals from other mobile computing devices for directing employee motion. First mobile computing device 412 transmits coverage signal 426, and receives coverage signal 427 from second mobile computing device 414 when second mobile computing device 414 is within reception range of first mobile computing device 412. Thus, one way of determining when distance D1 is getting too small (which indicates that first employee 136 is too close to second employee 137) is when first mobile computing device 412 receives coverage signal 427 from second mobile computing device 414. In some embodiments, proximity detection modules 418 and/or 488 determine, or compute, the distance D1 between first mobile computing device 412 and second mobile computing device 414. Proximity detection module 418 and 488 can use many different ways to determine or measure proximity, or distance D1, between first and second mobile computing devices 412 and 414. Proximity detection module 418 and 488 can use any of the means and method of detecting proximity as described above for first and second mobile computing devices 112 and 114, and proximity detection modules 118 and 188.

In the embodiment of system 410 shown in FIG. 6 and FIG. 7, base station 416 includes a proximity detection module 450, a direction module 458, a motion status module 452, and a coverage module 456. First and second coverage status indicators 430 and 432 are received by base station 416 and are delivered at least to coverage module 456. First and second proximity signals 440 and 442 received by base station 416 and are delivered at least to proximity detection module 450. First and second motion status indicators 447 and 448 are received by base station 416 and are delivered at least to motion status module 452.

Proximity detection module 450 determines whether distance D1 between first and second employee 136 and 137 is too small. Proximity detection module 450 gathers data relating to the locations of first and second mobile computing devices 412 and 414, and the distance between these devices, from many different sources. Proximity detection module 450 in this embodiment receives proximity information 440 and 442 from first and second mobile computing devices 412 and 414 relating to distance D1 between first and second mobile computing devices 412 and 414. Proximity information 440 and 442 includes information on distance D1 measured or computed by first and second mobile computing devices 412 and 414. Proximity information 440 and 442 can include computations of D1, or location, position, or signal strength measurements, for example, that will allow proximity module 450 to compute distance D1. In some embodiments, proximity module 450 computes distance D1 between first and second mobile computing devices 412 and 414. Proximity information 440 can include whether proximity module 418 and/or first mobile computing device 412 detects coverage signal 427. Proximity information 442 can include whether proximity module 488 and/or second mobile computing device 414 detects coverage signal 426.

Direction module 458 of base station 416 provides motion direction instructions 496 or 498 to first or second mobile computing devices 412 or 414, respectively, if it is determined by proximity detection module 450 that distance D1 between first mobile computing device 412 and second mobile computing device 414 is too small. In some embodiments, direction module 458 sends motion direction instruction 496 to first mobile computing device 412 in response to proximity module 450 receiving proximity information 440. In some embodiments, direction module 458 sends motion direction instruction 496 to first mobile computing device 412 in response to proximity module 450 determining that proximity distance D1 between first and second mobile computing devices 412 and 414 is less than a predetermined minimum distance.

Base station 416 and proximity detection module 450 can use many different methods to determine distance D1 and decide if either first employee 136 or second employee 137 should change direction to maintain maximum employee coverage on sales floor 164. When base station 416 determines that first employee 136 should change direction, direction module 458 of base station 416 transmits direction change instruction 496 to first mobile computing device 412. First mobile computing device 412 will, in response to receiving direction change instruction 496 from base station 416, output motion direction instruction 428 that directs employee 136 to change direction.

When base station 416 determines that second employee 137 should change direction, direction module 458 of base station 416 transmits direction change instruction 498 to second mobile computing device 414. Second mobile computing device 414 will, in response to receiving direction change instruction 498 from base station 416, output motion direction instruction 446 to employee 137 to change direction.

Proximity module 450 in some embodiments receives a computation of distance D1 from either proximity detection module 418 or proximity module 488. First mobile computing device 412 sends proximity information 440 to base station 416, which can include a computation of distance D1, or any other proximity information that can be used by base station 416 to determine if first mobile computing device 412 should receive direction change instruction 496. Second mobile computing device 414 sends proximity signal 442 to base station 416, which can include a computation of distance D1, or any other proximity information that can be used by base station 416 to determine if second mobile computing device 414 should receive direction change instruction 498. Proximity signals 440 and 442 are part of communication 444 and 445, respectively, between base station 416 and first and second mobile computing devices 412 and 414, as shown in FIG. 6 and FIG. 7. Proximity signals 440 and 442 can include a computation of distance D1, locations of first and/or second mobile computing devices 412 and 414, signal strength measurements of coverage signals 426 or 427, or other data related to distance D1.

Proximity module 450 can use many types of data and input to determine distance D1. In some embodiments, proximity module 450 uses a wireless received signal strength indicator (RSSI) to determine proximity distance D1. In some embodiments, proximity detection module 450 uses Bluetooth signals, 802.11 signals, radio frequency identification (RFID) signals, global positioning system (GPS) signals, compass signals, camera or video images, accelerometer signals, or other devices, measurements, or input to determine distance D1. These signals or data can be included in proximity signals 440 or 442, or received from other sources.

Direction module 458 outputs motion direction instruction 496 when base station 416 determines that first employee 136 should change direction. Direction module 458 outputs motion direction instruction 498 when base station 416 determines that second employee 137 should change direction. Base station 116 and direction module 458 can use many different criteria to decide when to output motion direction instructions 496 or 498. In some embodiments, direction module 458 outputs motion direction instruction 496 in response to first mobile computing device 412 and/or proximity detection module 418 receiving coverage signal 427 transmitted by second mobile computing device 414. In this specific embodiment, first mobile computing device 412 sends proximity information 440 to base station 416 indicating that first mobile computing device 412 detects second coverage signal 427 from second mobile computing device 414. Base station 416 send motion direction instruction 496 to first mobile computing device 412, directing first mobile computing device 412 to output motion direction instruction 428. Thus, in some embodiments, when first mobile computing device 412 gets close enough to second mobile computing device 414 that proximity detection module 418 receives coverage signal 427, direction module 458 outputs motion direction instruction 496, which tells first employee 136 to change their direction of motion. In some embodiments, base station 416 uses the signal strength of coverage signal 427 to determine if second mobile computing device 4114 is too close to first mobile computing device 412. In some embodiments, if the signal strength of coverage signal 427 is above a predetermined maximum signal strength, base station 416 determines that second mobile computing device 4114 is too close to first mobile computing device 412, and direction module 458 outputs motion direction instruction 496.

Similarly, in some embodiments, when second mobile computing device 414 gets close enough to first mobile computing device 412 that second mobile computing device 414 receives coverage signal 426, direction module 458 outputs motion direction instruction 498, which tells second employee 137 to change their direction of motion. In some embodiments, first and second mobile computing devices 412 and 414, and base station 416 will communicate to determine whether base station 416 should output motion direction instruction 496, 498, or both. Some examples of communications 444 and 445 are explained herein, but it is to be understood that many different forms and types of communication between base station 416 and first and second mobile computing devices 412 and 414 can be used to determine whether motion direction instruction 496 should be sent to first mobile computing device 412, or motion direction instruction 498 should be sent to second mobile computing device 414, or both.

Motion status module 452 collects first motion status indicator 447 from first mobile computing device 412, and second motion status indicator 448 from second mobile computing device 414. First motion status indicator 447 indicates whether first mobile computing device 412 is in motion or not, and second motion status indicator 448 indicates whether second mobile computing device 414 is in motion or not. In some embodiments, this determination of whether first or second mobile computing device 412 or 414 is in motion is used to determine whether to output motion direction instruction 496 or 498.

In some embodiments, direction module 458 of base station 416 outputs motion direction instruction 496 in response to proximity module 450 receiving proximity information 440, first motion status indicator 447 indicating that first mobile computing device 412 is in motion, and second motion status indicators 448 indicating that second mobile computing devices 414 is in motion. In some embodiments, direction module 458 of base station 416 outputs motion direction instruction 496 in response to proximity module 450 receiving proximity information 440, and first motion status indicators 447 indicating that first mobile computing devices 412 is in motion. In some embodiments, direction module 458 of base station 416 outputs motion direction instruction 498 in response to proximity module 450 receiving proximity information 442, and second motion status indicator 448 indicating that second mobile computing devices 414 is in motion.

Coverage module 456 receives coverage status indicator 430 from first mobile computing device 412, and coverage status indicator 432 from second mobile computing device 414. Coverage status indicator 430 indicates whether first mobile computing device 412 is in coverage mode or not. Coverage status indicator 432 indicates whether second mobile computing device 414 is in coverage mode or not. Coverage module 456 uses first and second coverage status indicators 430 and 432 to determine the coverage status of first and second mobile computing devices 412 and 414. Base station 416 and coverage module 456 can use first and second coverage status indicators 430 and 432 to determine whether base station 416 should send either first or second motion direction instructions 496 or 498 to first or second mobile computing devices 412 and 414.

In some embodiments, direction module 458 outputs motion direction instruction 496 when both first coverage status indicator 430 and second coverage status indicator 432 indicate their respective mobile computing devices 412 and 414 are in coverage mode, and proximity module 450 indicates distance D1 is less than a predetermined minimum distance. In some embodiments, direction module 458 outputs motion direction instruction 496 when both first coverage status indicator 430 and second coverage status indicator 432 indicate their respective mobile computing devices 412 and 414 are in coverage mode, both first and second motion status indicators 447 and 448 indicate that both first and second mobile computing devices 412 and 414 are in motion, and proximity module 450 indicates distance D1 is less than the predetermined minimum distance.

Coverage module 456 can use other information besides coverage status indicators 430 and 432 to determine the coverage status of first or second employee 136 or 137. In some embodiments, first or second employee 136 or 137 log in to server 416 to save a coverage status, or a job or task code that can be used to determine the coverage status, of either first or second employee 136 or 137, for example.

Base station 416 can use any combination of information from proximity module 450, motion status module 452, coverage module 456, or first and second mobile computing devices 412 and 414 to decide when to send motion direction instruction 496 to first mobile computing device 412 or motion direction instruction 498 to second mobile computing device 414. Base station 416 uses the information to determine if first employee 136 and second employee 137, as well as other employees in coverage mode, are in too close of proximity and should change their direction of motion. Base station 416 monitors the status and motion of employees on sales floor 164, and transmits motion direction instructions as needed to maximize the coverage of employees on sales floor 164. In some embodiments, base station 416 will determine the last time first and second mobile computing devices 412 and 414 were given a motion direction instruction 496 or 498, and use this information in deciding which mobile computing device 412 or 414 to send a new motion direction instruction 496 or 498 to. In some embodiments, base station 416 will send the new motion direction instruction to the mobile computing device that has gone the longest time without receiving a motion direction instruction. This strategy helps keep employees from having to change direction too often.

Figure 8:
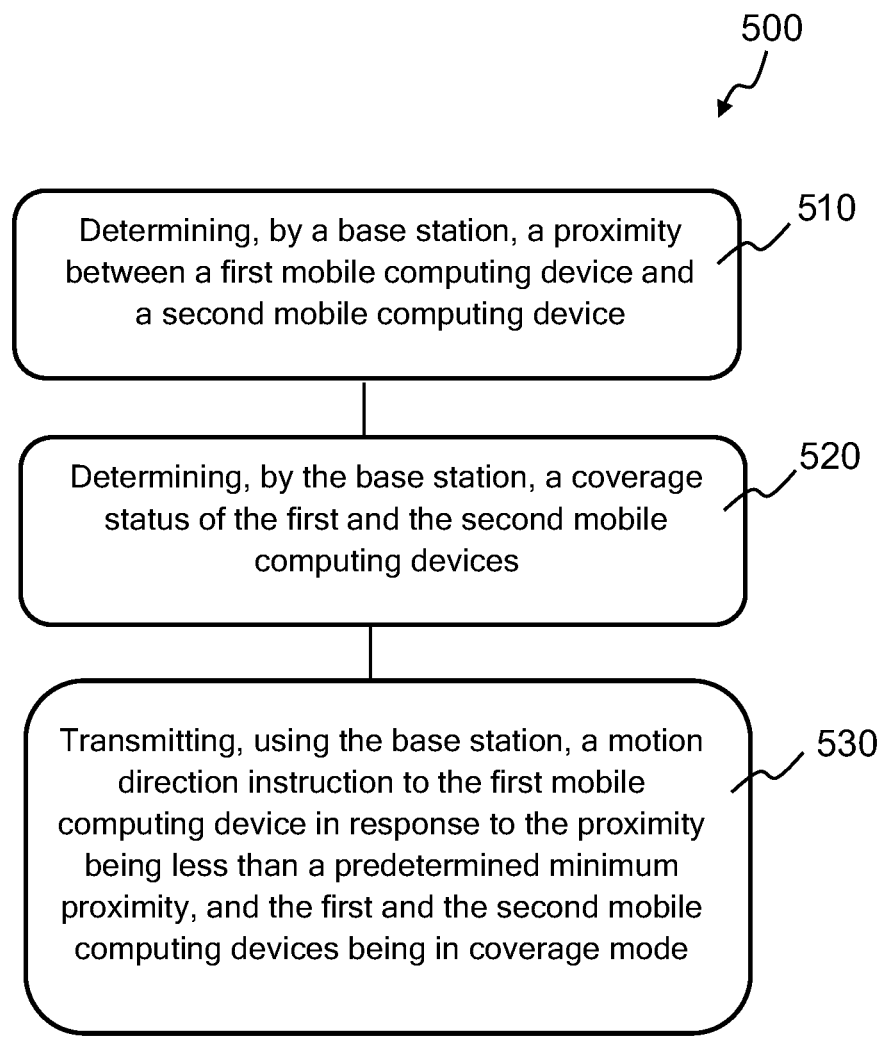
FIG. 8 illustrates another method of providing a motion direction instruction to an employee.

FIG. 8 illustrates a method 500 of providing a motion direction instruction to an employee carrying a first mobile computing device. Method 500 includes an act 510 of determining, by a base station, a proximity between a first mobile computing device and a second mobile computing device. Determining the proximity can be accomplished by many different methods, including receiving the proximity from the first or the second mobile computing devices, or computing the proximity based on information received from any source, including the first or the second mobile computing devices or data entered into the base station.

Method 500 also includes an act 520 of determining, by the base station, a coverage status of the first and the second mobile computing devices. Determining the coverage status can be accomplished by many different methods, including receiving the coverage status from the first or the second mobile computing devices, or determining the coverage status based on information received from other sources, including the base station or the employees carrying the first and the second mobile computing devices.

Method 500 also includes an act 530 of transmitting, using the base station, a motion direction instruction to the first mobile computing device in response to the proximity being less than a predetermined minimum proximity, and the first and the second mobile computing devices being in coverage mode. In some embodiments, the base station transmits the motion direction instruction in response to the proximity being less than a predetermined minimum proximity.

In some embodiments, method 500 includes determining, by the base station a motion status of the first and the second mobile computing devices. In some embodiments, the base station transmits the motion direction instruction in response to the proximity being less than a predetermined minimum proximity, the first and the second mobile computing devices being in coverage mode, and the first and the second mobile computing devices being in motion.

Figure 9:
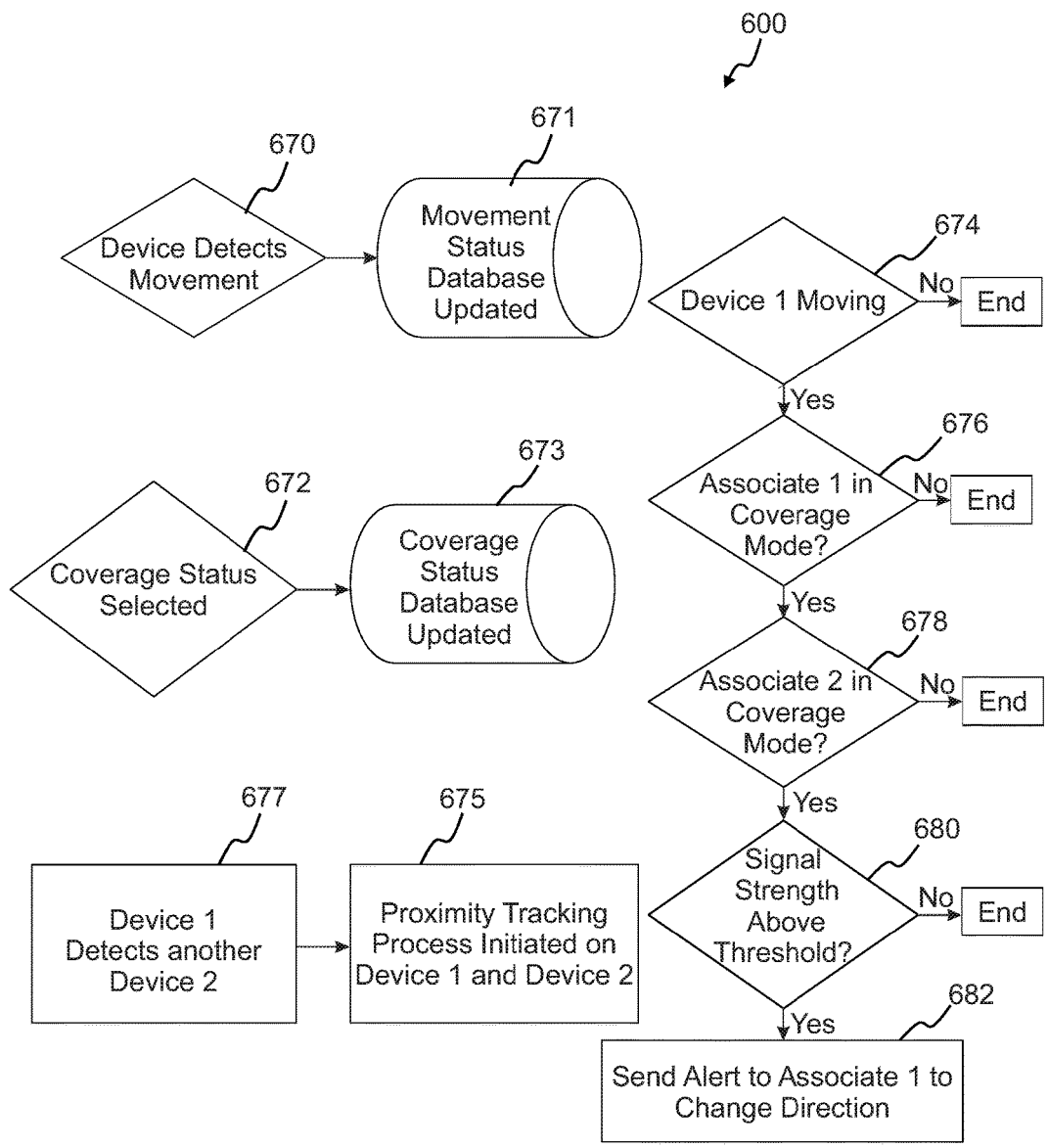
FIG. 9 illustrates a further method of providing a motion direction instruction to an employee.

FIG. 9 illustrates a method 600 of providing a motion direction instruction to a first associate carrying a first mobile computing device. At block 670, the first mobile computing device detects motion, and sends this motion status to a database as shown in block 671. The database can be in a base station or a server, or other data storage device. Block 672 shows coverage status of the first mobile computing device being determined by a selection made by the first associate, or by looking up a job status or job code of the first status. The coverage status is stored in the database at block 673. At block 677, the first mobile computing device detects a second mobile computing device carried by a second associate, and initiates proximity tracking of the proximity between the first and the second mobile computing devices at block 675.

Block 674 indicates that the method is continued if it is determined that the first associate is in motion, otherwise the method is ended. Block 676 indicates the method is continued if the first associate is determined to be in coverage mode. Coverage mode determination can be made by a selection by the first associate, or by a job or task code entry into the first mobile computing device. Block 678 indicates the method is continued if the second associate is determined to also be in coverage mode. Block 680 indicates the method is continued if the signal strength of the coverage signal is determined to be above a predetermined maximum signal strength. Block 682 indicates that the first associate is provided with a change direction instruction by the first mobile computing device if all of block 674, block 676, block 678, and block 680 are determined to be positive. Method 600 can include many other blocks, steps, or acts.

It has been shown and described how systems for directing employee motion can use information regarding the proximity, motion and coverage status of employees to maximize employee coverage in a retail store. Employee coverage is maximized so that customers in any area of the store can find help if they need it. Maximizing employee coverage often means maintaining at least a minimum proximity or distance between adjacent employees, in other words, not letting the proximity between employees get less than a predetermined minimum distance. The systems use mobile computing devices carried by employees, and in some embodiments, a base station, to determine the proximity of adjacent employees, and determine if a motion direction instruction should be sent to an employee. Motion direction instructions are provided to employees by the mobile computing device they are carrying to tell the employee to change their direction of motion, and thus moving them away from other employees in coverage mode. Motion direction instructions are used to maintain the minimum distance between the employees, and maximize employee coverage.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A mobile computing device for directing motion, the mobile computing device comprising:
    a proximity detection module, wherein the mobile computing device for directing motion is a first mobile computing device, and wherein the proximity detection module receives a coverage signal transmitted by a second mobile computing device;
    a motion detection module, wherein the motion detection module detects whether the first mobile computing device and/or the second mobile computing device are in motion;
    and
    a direction module, wherein the direction module outputs a motion direction instruction in response to:
        the proximity detection module receiving the coverage signal transmitted by the second mobile computing device; and
        the motion detection module detecting the first mobile computing device and the second mobile computing device are both in motion; and
    wherein the direction module does not output the motion direction instruction when one of the first mobile computing device and the second computing device are not in motion.

2. The mobile computing device of claim 1, wherein the motion direction instruction comprises a new direction of motion.

3. The mobile computing device of claim 2, wherein the first mobile computing device is carried by a first employee of a retail store, and wherein the second mobile computing device is carried by a second employee of the retail store.

4. The mobile computing device of claim 1, wherein the direction module outputs the motion direction instruction in response to:

the proximity detection module receiving the coverage signal transmitted by the second mobile computing device;

a strength of the coverage signal being above a predetermined maximum signal strength; and the motion detection module detecting the first mobile computing device and the second mobile computing device are both in motion.

5. The mobile computing device of claim 1, wherein the proximity detection module computes a distance between the first mobile computing device and the second mobile computing device, and wherein the direction module outputs the motion direction instruction in response to:

the proximity detection module receiving the coverage signal transmitted by the second mobile computing device;

the motion detection module detecting the first mobile computing device and the second mobile computing device are both in motion; and the distance being less than a predetermined minimum distance.

6. The mobile computing device of claim 5, further comprising a coverage module, and wherein the coverage module receives:

a first coverage status indicator from the first mobile computing device, wherein the first coverage status indicator indicates a first status of a first employee carrying the first mobile computing device; and a second coverage status indicator from the second mobile computing device, wherein the second coverage status indicator indicates a second status of a second employee carrying the second mobile computing device;

and wherein the direction module outputs the motion direction instruction in response to:

the proximity detection module receiving the coverage signal transmitted by the second mobile computing device;

the motion detection module detecting that the first mobile computing device and the second mobile computing device are both in motion;

the distance being less than a predetermined minimum distance; and the first and the second coverage status indicators indicating that both the first and the second employees are a part of a network of employees covering a retail sales floor.

7. A base station device for coordinating movements of a first and a second mobile computing device, wherein the base station device comprises:

a proximity module, wherein the proximity module receives proximity information regarding a proximity between the first mobile computing device and the second mobile computing device;

a motion status module, wherein the motion status module detects whether the first mobile computing device and/or the second mobile computing device are in motion;

a direction module, wherein the direction module sends a motion direction instruction to the first mobile computing device in response to the motion status module detecting the first mobile computing device and the second mobile computing device are both in motion;

and wherein the direction mobile does not output a motion direction instruction when one of the first mobile computing device and the second mobile computing device are not in motion.

8. The base station device of claim 7, wherein:

the first mobile computing device is carried by a first employee;

the second mobile computing device is carried by a second employee;

the base station device further comprises a coverage status module;

the coverage status module determines whether the first employee is a part of a web of employees covering a retail sales floor;

the coverage status module determines whether the second employee is a part of the web of employees covering the retail sales floor; and the direction module sends a motion direction instruction to the first mobile computing device in response to:

the motion status module detecting the first mobile computing device and the second mobile computing device are both in motion; and the coverage status module determining both the first and the second employee are a part of the web of employees covering the retail sales floor.

9. The base station device of claim 8, wherein:

the proximity module uses the proximity information to compute a proximity distance between the first mobile computing device and the second mobile computing device;

the direction module sends a motion direction instruction to the first mobile computing device in response to:

the motion status module detecting that the first mobile computing device and the second mobile computing device are both in motion;

the coverage status module determining that both the first and the second employee are a part of the web of employees covering the retail sales floor; and the proximity module determining that the proximity distance is less than a predetermined minimum proximity distance.

10. The base station device of claim 7, wherein the base station device is a server, and wherein the motion status module receives a first motion status indicator from the first mobile computing device, and a second motion status indicator from the second mobile computing device.

11. The base station device of claim 7, wherein the motion direction instruction comprises a new direction of motion.

12. The base station device of claim 11, wherein the first mobile computing device is carried by a first employee of a retail store, and wherein the second mobile computing device is carried by a second employee of the retail store.

13. A method of determining whether to output a motion direction instruction from a first mobile computing device, the method comprising:

detecting, using a proximity detection module of the first mobile computing device, a coverage signal transmitted by a second mobile computing device;

detecting, using a motion detection module of the first mobile computing device, whether the first mobile computing device is in motion;

detecting, by the motion detection module of the first mobile computing device, whether the second mobile computing device is in motion, using a second mobile computing device motion indicator sent by the second mobile computing device;

and outputting, using the first mobile computing device, a motion direction instruction in response to the motion detection module detecting that both the first and the second mobile computing device are in motion, and wherein the first mobile computing device does not output a motion direction instruction when one of the first mobile computing device and the second computing device are not in motion.

14. The method of claim 13, further comprising determining, using a first coverage status indicator output by a coverage module of the first mobile computing device, whether the first mobile computing device is carried by a first employee that is part of a network of employees covering a retail sales floor.

15. The method of claim 14, further comprising determining, by the coverage module of the first mobile computing device and using a second coverage status indicator received from the second mobile computing device, whether or not the second mobile computing device is carried by a second employee that is part of the network of employees covering the retail sales floor.

16. The method of claim 15, further comprising determining, using the proximity detection module of the first mobile computing device, a distance between the first and the second mobile computing device.

17. The method of claim 16, wherein outputting the motion direction instruction comprises outputting the motion direction instruction in response to:
the distance between the first and the second mobile computing device being less than a predetermined minimum distance;
the coverage module determining both the first and the second employee are a part of the network of employees covering the retail sales floor; and
the motion detection module detecting both the first and the second mobile computing device are in motion.

18. The method of claim 17, further comprising detecting a signal strength of the coverage signal transmitted by the second mobile computing device.

19. The method of claim 18, wherein outputting the motion direction instruction comprises outputting the motion direction instruction in response to:
the distance between the first and the second mobile computing device being less than a predetermined minimum distance;
the coverage module determining that both the first and the second employee are part of the network of employees covering the retail sales floor;
the signal strength being greater than a predetermined maximum signal strength; and
the motion detection module detecting that both the first and the second mobile computing device are in motion.

20. The method of claim 19, wherein the motion direction instruction comprises a new direction of motion.

* * * * *